Oct. 28, 1952     C. JOHNSON     2,615,738
LINKAGE CONNECTOR
Filed March 18, 1950
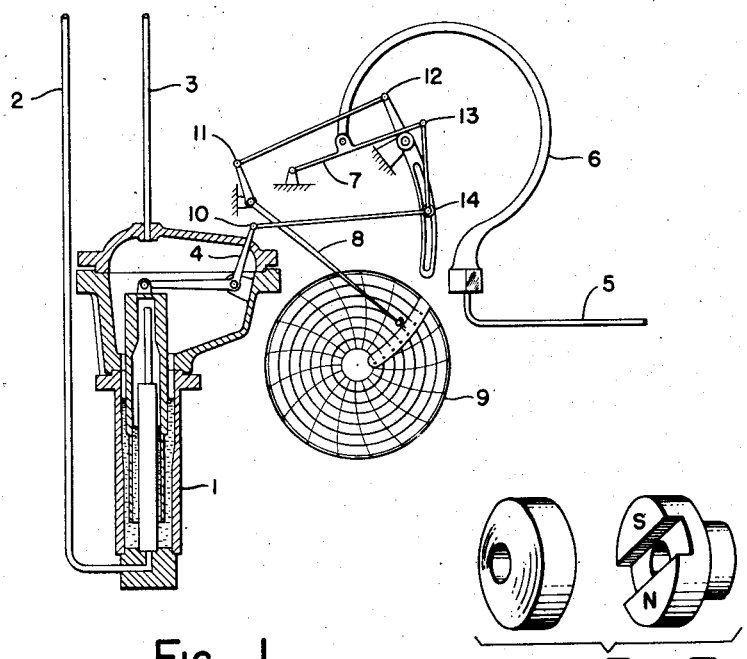
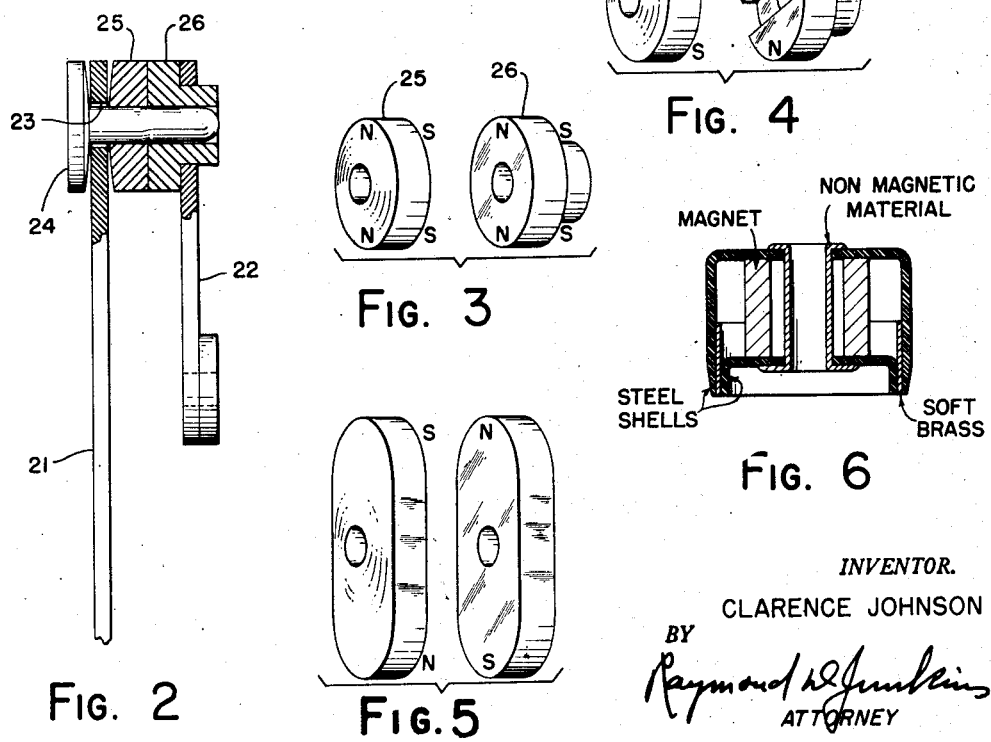
INVENTOR.
CLARENCE JOHNSON
BY
Raymond W. Junkins
ATTORNEY Patented Oct. 28, 1952

2,615,738

UNITED STATES PATENT OFFICE 2,615,738

LINKAGE CONNECTOR

Clarence Johnson, South Euclid, Ohio, assignor to Bailey Meter Company, a corporation of Delaware Application March 18, 1950, Serial No. 150,365

9 Claims. (Cl. 287—96)

My invention lies generally in the field of connections and couplings. More particularly my invention has application in the numerous mechanical linkage systems in which simplicity of element joinder is desired, coupled with ease of disjoinder for adjustment and disassembly purposes, and particularly related to instrument linkages.

As the present problem is approached there can be seen at least three paramount objectives to be attained in mechanically coupling driving and driven linkage members. It is first seen that the junction means must allow a desirable latitude of angular movement between the joined members, second, there must be a minimum of friction and binding which would promote hysteresis in the system operation and finally, the structure must be simple from the standpoint of facilitating manufacture and assembly.

Every connection or coupling in a system of linkage is vitally important per se and, as their number in even the simpler systems is often numerically large, the attainment of all the paramount advantages outlined supra is necessary. Somewhat auxiliary are those desirable structural features which promote freedom from vibrational effects, freedom from faulty operation due to dirt and foreign material, and positive indication of misalignment or defective coupling.

A means of comparing the present invention with the prior art rests in the well known structure for joining driven and driving members which is descriptively referred to as the pin and clip combination. A pin, integral with perhaps the driving member and 90° to the plane of activation, may be inserted through a hole in the driven member and a pivoted clip on the driving member swung over the top of the pin to guard against disengagement.

It is perhaps obvious wherein lie the limitations of the pin and clip combination. There is, of course, danger that an inexperienced operator will fail to detect a bent pin or a loose clip, binding and producing friction and causing possible disengagement. It is to overcome the limitations and complications attendant the pin and clip combinations and similar mechanical connections, that the present invention was devised.

It is an object of my invention to provide a means of coupling two operative linkage members together through a structure which will allow unrestricted rotation in a plane, of either member, about the pivotal structure.

It is another object of my invention to provide a coupling between two linkage members which may be disconnected by a single operator-originated movement of either of the links.

It is a further object of my invention to reduce danger of coupling misalignment and render a positive indication should misalignment occur.

Another object of my invention is to provide a coupling pivot upon which dirt and foreign matter have a minimum detrimental effect.

It is another object of my invention to provide a pivotal coupling which is simple of manufacture and assembly.

Fig. 1 is a linkage system embodying my invention.

Fig. 2 is an enlarged cross-sectional detail of a coupling of Fig. 1.

Fig. 3 is a detail of Fig. 2.

Fig. 4 is another embodiment of the detail of Fig. 3.

Fig. 5 is another embodiment of the detail of Fig. 3.

Fig. 6 is another embodiment of the detail of Fig. 3.

Fig. 7 is another embodiment of the detail of Fig. 3.

In Fig. 1 I have disclosed a system of linkage by means of which two variables are interrelated into a value which may be expressed upon a chart. It is not deemed necessary to elaborate upon the theory of variable production, interrelated by the linkage system. It is sufficient that a device 1 is indicated, responsive to differential pressures applied through pipes 2 and 3, positioning a member 4 in accordance with a differential pressure relation.

In accordance with a second variable, Bourdon tube 6 is positioned by pressures in pipe 5 to, in turn, position a member 7 of the linkage system in accordance with the magnitude of the variable. From the foregoing it can be readily seen that with two variables determining the position of members in the disclosed linkage system, pointer 8 is mechanically positioned relative to chart 9 for indicating and/or recording the relation between the variables.

As the various members of the linkage system, connected and between members 4 and 7 and pointer 8, position to give a final indication on chart 9, they pivot about points 10, 11, 12, 13 and 14. In accordance with previously observed objectives it is desirable that these pivots allow sufficient angular movement throughout their predetermined range, impart no friction to the system and yet remain of the simplest possible construction in their manufacture and assembly.

The system of Fig. 1 was chosen in illustration for its multiplicity of pivotal points to whose structure my invention is directed. The number of pivots are relatively high and thereby serve to emphasize the desirability of the improved results attained by my invention.

In Fig. 2 I show, in cross-section and to enlarged scale, details in the structure of one embodiment of my invention of application in a system of linkage as illustrated in Fig. 1. In representation of one of the linkage members of the system of Fig. 1, I show member 21 driving, or being driven, by member 22 and pivoted through the structure of my invention. Member 21 is provided with a hole 23 near one end and in which is placed the shaft of headed pin 24.

The hole 23 provides the bearing surface of the pivot. The diameter must be just enough in excess of the pin shaft diameter to allow member 21 to rotate with a minimum of friction and yet introduce no undesirable looseness or play. The limits of the amount of play at this point in the structure would be a factor of the service required of the linkage system and therefore falls into the realm of design of the individual application.

The head of pin 24 need only be sufficiently large to retain member 21 on the shaft. The bearing of the head on link 21 is reduced to line contact by tapering the inside head surface from the pin shank to the perimeter of the head. With the head surface, tapered in the manner disclosed, coming into contact with the link member 21, friction is reduced to a minimum during the normal activation of the link about the shaft in a two dimensional plane and not increased materially should a degree of misalignment be introduced. Varying the degree of head inner-surface taper of the pin will vary the amount of friction with link 21 should it vary from a true 90° alignment with the pin shaft. Anticipated member 21 and pin shaft alignment variation will determine the optimum degree of pin head taper and from this point of disclosure the structure again falls into the realm of design.

The pin shaft, from the head, is of uniform diameter for a length sufficient to accommodate member 25 disclosed here to be of the same diameter and generally cylindrical shape as is the pin head itself. As will be disclosed hereinafter, the shape of this member 25 may be varied in certain dimensions but is always provided with a centrally located hole which press-fits on the pin shaft. The pin head link 21 and member 25 are then aligned along the pin shaft close enough together to reduce the side motion allowance of link 21 to a desired minimum. The surface of member 25 adjacent link 21 is given a taper from its hole outward after the manner of that taper of the head of pin 24, and captured link 21 rotates about the pivot structure of pin 24 and member 25 continuously or to any degree desired.

At this point is seen another of the fundamental advantages of my structure in that should it be desired to give link 21 a reciprocating motion, the pivot structure may be given a circulatory motion. Power transmission involving circulatory motion of a transmission member about a point is therefore seen as possible through my pivot structure which could not be accomplished in the heretofore disclosed pin and clip combination.

It is seen that the pin shaft beyond member 25 is given a taper to allow ease of insertion and withdrawal of the pin shaft from a hole, or a recess, in a member 26. Member 26 is generally similar in shape to member 25 and is rigidly connected to link member 22. The hole, or recess, in member 26 accommodating the tapered portion of the pin shaft is centrally located in member 26, and is deep enough, or the pin shaft is short enough, to allow members 25 and 26 to present flat surfaces to one another. With a means of bonding 25 and 26 together, the combination of pin 24, members 25 and 26 and link member 22 become a unit about which link 21 can rotate in the function heretofore described.

To bond members 25 and 26 together I have magnetized either 25 or 26, or both. With 25 or 26, or both, magnets, my pivotal structure may be simply and positively formed by inserting the tapered portion of the pin shaft in member 26 until the magnetic lines of flux bond 25 and 26 together into a unit. To disassemble my pivot structure, an operator need only overcome the magnetic force by a direct pull which separates 25 and 26. The strength of the magnetic force is governed by sizing and shaping permanent magnets 25 and/or 26. The design of permanent magnets is accomplished in general by empirical methods and I will suggest hereinafter only some of the general shapes that may be given magnets adapted for use in my invention.

In Fig. 3 I show magnetic members 25 and 26 with a pole uniformly distributed over the flat surface of each magnet, the opposed faces of 25 and 26 being given poles of opposite polarity. However, magnetizing only one of the members will produce a relatively weaker bond between 25 and 26 which will have to be accounted for in design.

A method of increasing the magnetic strength of the magnet shapes of Fig. 2 and Fig. 3 is illustrated in Fig. 4. A channel is made across the face of either, or both, magnets 25 and 26 and a face contains both poles. This will produce magnets more similar to the conventional horseshoe type rather than the bar type of Fig. 3 with consequent strength increase in accordance with established principles of both types. Of course, possible repulsion of like poles can be avoided by magnetizing only one of the magnets as suggested supra.

Another means of strengthening the pole attraction may be accomplished by lengthening the distance between poles of the bar type of Fig. 3 by giving the magnets an elliptical shape as disclosed in Fig. 5.

Still another means of gaining permanent magnet strength is expressed in Fig. 6 where I have shown a well known commercial magnetic assembly by means of which high magnetic strength is derived from relatively small assembly of parts. The assembly utilizes the "shunt" method of magnetic concentration. A flux field of a cylindrical magnet is passed through two conducting paths to a small air gap, or equivalent, between them and around which the field concentrates.

For its size, this magnetic structure has great strength, and with one of the links mounted with a structure of this nature and the other carrying a soft iron member, a pivot can be made of practical strength, and size can be kept within reasonable limits.

Referring now to Fig. 7, I have shown a choice of structure which was heretofore indicated as a possible modification of Fig. 3. Actually, Fig. 7 is a compromise between Figs. 3 and 4 in that one of the bodies, 25 or 26, is channeled to form a horse-shoe type of magnet while the unchanneled body is not magnetized at all but is attracted to the magnetic body to bond both bodies together. The unchanneled body should be of easily magnetized material and low retentivity, such as the soft irons.

While I have chosen to illustrate and describe certain advantageous embodiments of my invention, it will be understood that this it by way of example only and I am not to be limited thereto.

What I claim as new and desire to secure by Letters Patent of the United States, is:

1. A pivot connection between two members of a linkage system including, a driven member having a hole therethrough, a pin free to rotate in the hole of the driven member, a magnetized first body connected to said pin with said driven member restrained between the pin head and said body, a driving member, and a magnetized second body connected to the driving member and having a hole accommodating the pin.

2. The pivot connection of claim 1 in which one of the bodies is of a material readily magnetized and of low retentivity while the other is a permanent magnet.

3. In a system of linkage having driving and driven members, a driving member with an aperture therethrough, a headed pin adapted to rotate freely in the aperture of said driving member, a first permanent magnet connected rigidly to said pin capturing the driving member between itself and the pin head and having a channel through the center of the face away from said pin head and captured driving member, a driven member, and a second permanent magnet similar to the first magnet connected to said driven member and having a recess for accommodating so much of the pin as will allow contact between the magnet faces.

4. In a magnetic coupling between a driven and driving linkage, a pin member accommodated within an aperture of a first linkage member freely enough to rotate with a minimum of friction, a head on said pin member with its face adjacent the accommodating link tapered from its center to its perimeter, a first magnetic body connected to said pin capturing said link between itself and said pin head and having that face of it adjacent said link tapered from its center to its outer edge elongated in an elliptical shape to lengthen the flux path between the poles, and a second magnetic body connected to a second linkage member and of a shape assumed by the magnetic first body and accommodating the pin length necessary to allow contact between the flat surfaces of the two magnetic bodies.

5. The magnetic coupling of claim 4 in which one of the magnetic bodies is of a readily magnetizable material and the other body is permanently magnetized.

6. In a magnetic coupling between a driven and driving linkage, a pin member with a single head tapering from the pin shank to the head edge, means of accommodation in one of said linkages which will allow free rotation of the pin shank, a soft iron wafer-member tapered in manner similar to that of the pin head and pressed solidly on said pin shank to retain the accommodating link with said tapered pin head, and a permanent magnet structure connected to the other of said linkages including two shells of magnetic material concentric and connected through a cylindrical magnet whose flux is conducted by the shells to their adjacent edges separated by a small air gap equivalent and aligned for contact with the face of the soft iron wafer-member by the pin shank.

7. In a magnetic coupling, a first linkage member with an aperture therethrough, a second linkage member, a pin member accommodated within the aperture of the first linkage member and sized to rotate therein with a minimum of friction, a head on said pin member with its connected face tapered from the connected pin to its outer edge, a first cylindrical magnetic body connected to the pin member so as to capture the first linkage member between the head and a body face tapered from the center of the face to its perimeter, and a second cylindrical magnetic body connected to the second linkage member with an aperture therethrough accommodating so much of the pin as will allow contact between the two magnetic bodies.

8. The magnetic coupling of claim 7 in which one of the magnetic bodies is of a readily magnetizable material and the other body is permanently magnetized.

9. In a system of linkage having driving and driven members, a driving member with an aperture therethrough, a headed pin adapted to rotate freely in the aperture of the driving member, a metallic body of low magnetic retentivity connected rigidly to the pin capturing the driving member between itself and the pin head and presenting a smooth face away from the pin head and captured driving member, a driven member, and a permanent magnet connected to the driven member so as to present a channeled face to the smooth face of the metallic body and having a recess for accommodating so much of the pin as will allow contact between the faces.

CLARENCE JOHNSON.

No references cited.